United States Patent [19]
Faller

[11] Patent Number: 5,149,014
[45] Date of Patent: Sep. 22, 1992

[54] ROTARY WING AIRCRAFT

[75] Inventor: Alexander Faller, Ergoldsbach, Fed. Rep. of Germany

[73] Assignee: Alexander Faller Maschinenbau, Ergoldsbach, Fed. Rep. of Germany

[21] Appl. No.: 485,945

[22] Filed: Feb. 27, 1990

[30] Foreign Application Priority Data

Feb. 27, 1989 [DE] Fed. Rep. of Germany ....... 3906109

[51] Int. Cl.$^5$ ............................................. B64C 27/18
[52] U.S. Cl. .............................. 244/17.19; 244/17.11; 416/20 R; 416/90 A
[58] Field of Search .................. 244/6, 7 A, 8, 17.11, 244/17.19, 17.25; 416/18, 20 R, 21, 22, 90 A, 91, 148, 159

[56] References Cited

U.S. PATENT DOCUMENTS

| | | | |
|---|---|---|---|
| 3,406,759 | 10/1968 | Nutku | 416/90 A X |
| 3,623,824 | 11/1971 | Wilde et al. | 416/20 X |
| 3,853,424 | 12/1974 | Bernaerts | 416/90 A X |
| 4,407,466 | 10/1983 | Thompson et al. | 244/17.11 |
| 4,598,887 | 7/1986 | Jordan | 244/17.11 |
| 4,830,312 | 5/1989 | Hain et al. | 244/17.11 |

FOREIGN PATENT DOCUMENTS 1559087  3/1969  France ................ 244/7 A

Primary Examiner—Joseph F. Peters, Jr.
Assistant Examiner—Carla Mattix
Attorney, Agent, or Firm—Cohen, Pontani, Lieberman & Pavane

[57] ABSTRACT

A rotary wing aircraft with rotor blades mounted on a rotor head and with reaction drive. The rotor blades have hollow interiors and are provided on their trailing edge with at least one outlet opening for compressed air supplied via the rotor head. Such rotor head may include an air suction region in which there is mounted a suction device having a pressure side connected to the hollow interiors of the rotor blades.

15 Claims, 5 Drawing Sheets

ROTARY WING AIRCRAFT

BACKGROUND AND SUMMARY OF THE INVENTION

The present invention relates to a rotary wing aircraft with rotor blades mounted on a rotor head and with jet drive.

Rotary wing aircraft or helicopters are known in which the rotor is driven by an engine, for instance an aircraft engine or a gas turbine.

Such helicopters require a torque compensation around the yaw axis which can be achieved either by the arrangement in pairs of identical rotors with opposite direction of rotation or by a tail rotor. The structural expense and the loss in power by transmissions and the like are considerable.

On the other hand, helicopters with reaction drive do not require torque equalization since there is no drive moment on the fuselage of the aircraft. To be sure, also in the case of helicopters of this type, the measures necessary for the drive are considerable in lieu thereof; this is because the rotors require drive units at their blade tips, or gas turbines arranged in the fuselage of the aircraft, for supplying hot gas to thrust nozzles arranged on the blade engine.

An object of the invention is to create a rotary wing aircraft of the aforementioned type, the drive of which for the rotor blades requires the least possible expense without requiring torque compensation around the yaw axis in order to have available an aircraft which can lift large loads with small engine power, which can be purchased and maintained at low cost, and which are simple to handle and are of low weight.

In accordance with the invention, this foregoing object is achieved in the case of a rotary wing aircraft of the above-indicated type in the manner that the rotor blades mounted on the rotor head are hollow and have at least one outlet opening on their trailing edge for the compressed air fed via the rotor head.

The compressed air can be produced in this case by a compressor which is arranged in the fuselage of the rotary wing aircraft and forces compressed air, via the hollow rotor head, into the rotor blades. The outlet openings on the trailing edge of the rotor blades can be developed as holes or slots which are distributed over a part of the blade length or over the entire length of the blade.

In one particularly advantageous embodiment of the invention, the rotor head is developed as an air suction connection in which there is mounted a suction member, the pressure side of which is connected to the hollow rotor blades.

The invention provides a helicopter having a novel rotor system in which air is drawn from above—or below—and forced into the hollow rotor blades, where it produces at the outlet slots the desired reaction drive for the rotor and, in addition, results in a lengthening of the blade profile so that the emerging air at the same time produces the rotary drive and increases the lift. The centrifugal acceleration of the compressed air in the hollow rotor blades increases the reaction effect.

In a further form of the invention, the suction member is an impeller (i.e. casing screw of a compressor) which is rotatively driven around the axis of the rotor head and behind which stationary guide vanes are arranged in the suction direction. Instead of the impeller, a propeller or a prop fan can also be provided. The guide vanes have the job of reducing the rotation of the air to a minimum.

For the rotary drive of the suction member an engine is provided which constitutes an internal combustion engine and can be fastened in the non-rotatable rotor head itself. In this way, a very compact construction is obtained, the fixed rotor head requiring no torque compensation, so that no measures are necessary for a tail rotor or the like. The sole rotating member in the rotor is the suction member, which does not require torque equalization. For this there suffices a simple rudder which can be pivoted oblique or combined on the tail of the rotary wing aircraft and be blown against from top to bottom by the rotor so that the desired rotation around the yaw axis can be carried out in a hovering condition.

Instead of the rudder, control nozzles can also be developed on both sides of the tail, they being connected by connecting lines to the pressure side of the rotor head.

It is particularly advantageous if the engine for the drive of the suction member is seated in the communication path between its pressure side and the hollow rotor blades. In this way the air drawn in serves to cool and at the same time to charge the engine, which thus does not require any compressor. The exhaust gases of the engine, on their part, produce additional pressure in the rotor blades, thus increasing the torque; furthermore, they heat the rotor blades thereby preventing icing. Since the exhaust gases are not given off directly outward but flow into the rotor blades, the latter act to dampen noise, as a result of which the sound level of the helicopter is very low. The suction opening which is developed on the top of the rotor head also produces a reducing effect on the noise level since the sound here is lost in funnel shape in upward direction.

It should be pointed out here that the vacuum produced by the suction member exerts an additional lifting force on the aircraft.

As a further development of the invention, the rotor head is developed behind the pressure side of the suction member as a radially outwardly opening annular space on the cylindrically developed open outer surface of which there is mounted a radially inwardly open connecting ring which is rotatable around the axis of the rotor head and bears the rotor blades in the region of radial outlet openings.

Since in this arrangement the connecting ring is mounted for free rotation on the rotor head, no devices such as a freewheel or coupling are necessary in order to place the rotor in autorotation when the drive fails. The rotor blades themselves are arranged on the connecting ring via flapping hinges or drag hinges. The angle of attack of the rotor blades can be kept very small, for instance 4°, resulting in the structural advantage that switching to autogyro operation is dispensed with.

The displacement of the rotor blades around the drag hinge can be effected in very simple fashion since suitable devices can be arranged on the fixed rotor head, for instance a swashplate or a cam control.

In order to swing the rotor plane so as to produce a tractive force for forward movement it is possible to fasten the rotor head adjustably via a hinge bearing on the rotary wing aircraft. In the event of such a measure, the means for the blade displacement around the drag hinge are dispensed with.

In addition, the rotor head can be fastened displaceably on the rotary wing aircraft in the longitudinal direction thereof so that trimming of the center of load can be effected.

In accordance with another feature of the invention, deflector ribs leading to the outlet slots are fastened in each rotor blade. Their length preferably increases toward the tip of the rotor blade. In this way, part of the stream of air flowing through the rotor blade is deflected at each deflection rib to the corresponding outlet slot, while a further part passes to the outlet slots provided further to the rear.

BRIEF DESCRIPTION OF THE DRAWING

The invention will be explained below with reference to an embodiment shown in the drawing, in which.

DETAILED DESCRIPTION OF THE PREFERRED EMBODIMENT

Figure 1:
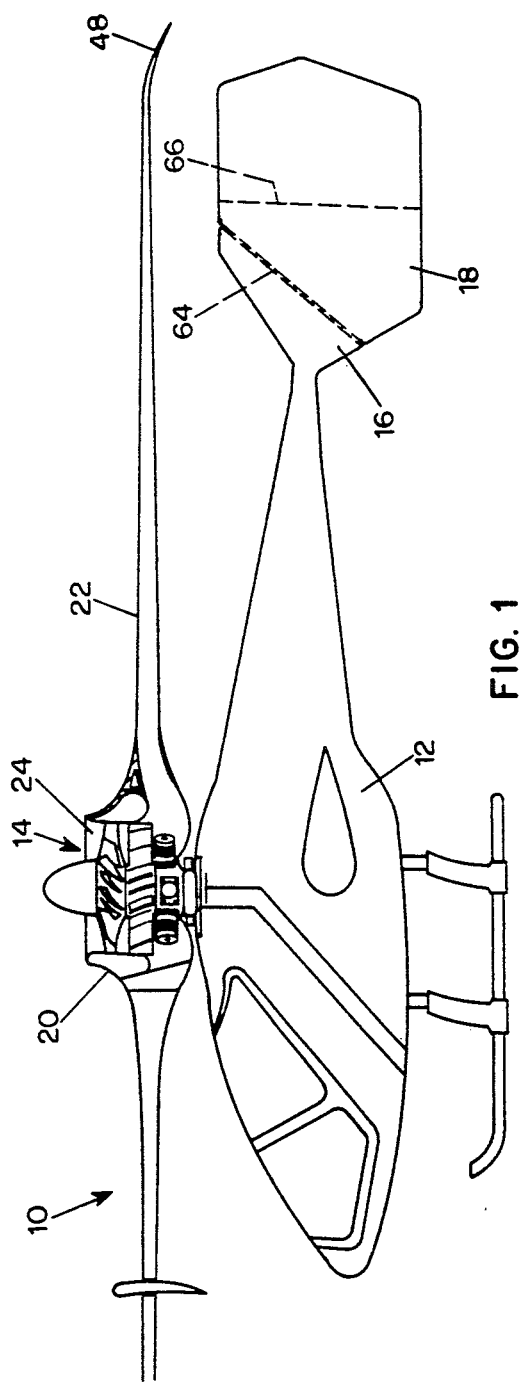
FIG. 1 is a side view of a rotary wing aircraft according to the invention.

FIG. 1 is a side view of a rotary wing aircraft 10 having a fuselage 12 on the top of which a rotor 14 is arranged. A rudder 18 is fastened on the tail 16.

Figure 5:
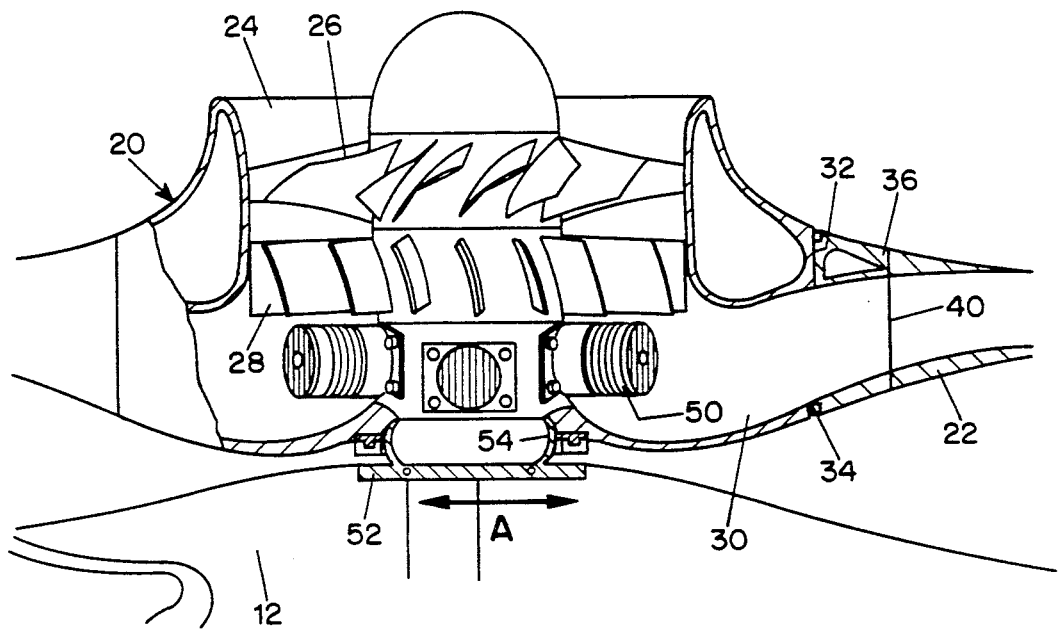
FIG. 5 is a vertical section through the rotor.

As can be noted in particular from FIG. 5, the rotor 14 consists of a rotor head 20 on which four rotor blades 22 are mounted. The rotor head 20 is developed as an air-suction connection 24 which is open in the upward direction and within which an impeller 26 that is rotatably driven around the axis of the rotor head 20 is mounted and draws air in from above. Stationary guide vanes 28 arranged on the pressure side of the impeller 26 reduce the twist of the air drawn in to a minimum. Behind the guide vanes 28, in the direction of flow, the rotor head 20 is developed as a radially outwardly-open annular space 30 on the cylindrically developed open outer surface 32. On surface 32 a connecting ring 36 is mounted via anti-friction bearings 34 for rotation around the axis of the rotor head 20. Four connections 38 (FIG. 4) extend from the connecting ring 36 corresponding to the number of rotor blades 22, and bear the corresponding rotor blades 22 in the region of their radial outlet openings 40.

Figure 2:
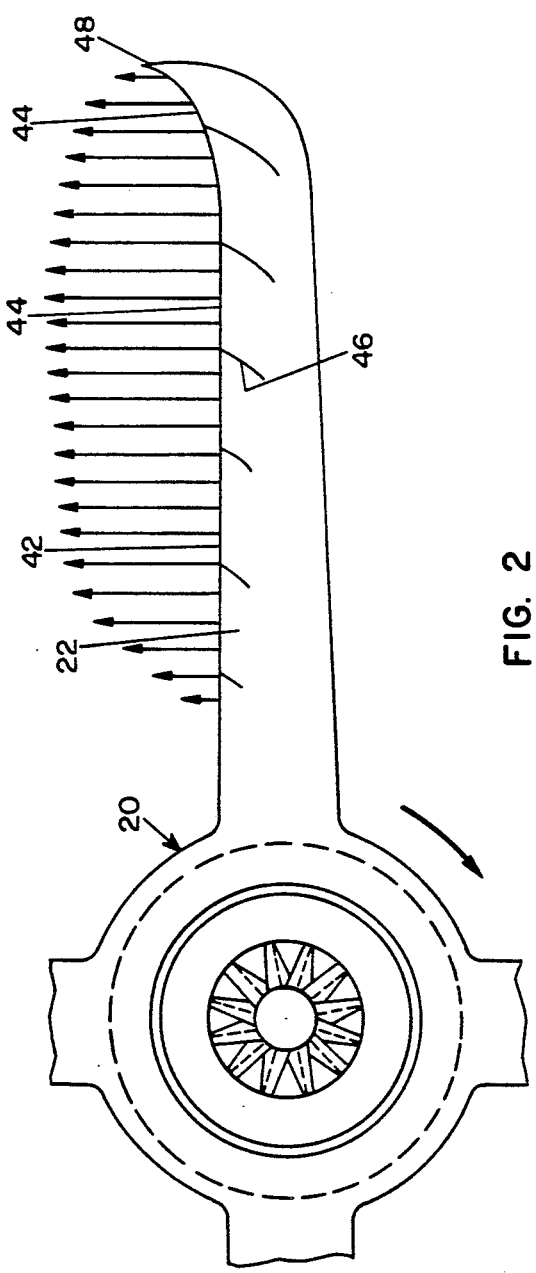
FIG. 2 is a top view of part of the rotor.
Figures 3, 4:
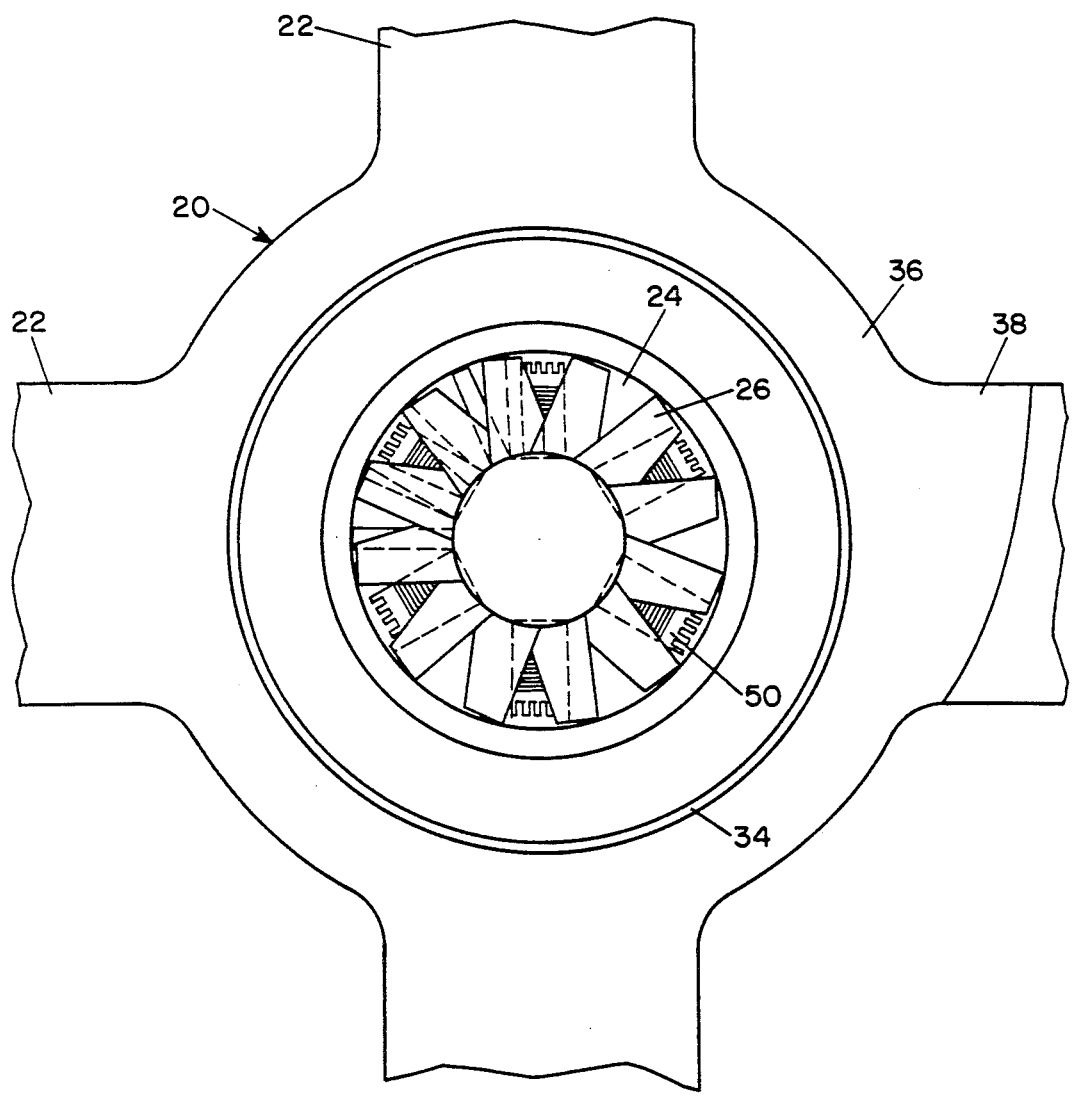
FIG. 3 is a cross section through a rotor blade.
FIG. 4 is an enlarged top view of the rotor.

In accordance with the invention, each rotor blade 22 is hollow. As shown in FIG. 3, the rotor blade 22 is provided on its trailing edge 42 with outlet slots 44 which are arranged over the length of the blade. From FIG. 2 it can be noted that corresponding deflection ribs 46 lead to the outlet slots 44, the ribs being developed in the rotor blade 22 and their length increasing towards the tip 48 of the rotor blade 22. In this way, part of the air drawn in which flows into the hollow rotor blade 22 is conducted in the region of the first deflection rib 46 to the corresponding outlet slot 44 while a part corresponding to the projection of the following deflection rib 46 is deflected to the next outlet slot 44, and so on. The residual air flow arriving at the tip 48 of the rotor blade 22 passes outward here via the last outlet slot 44.

The air emerging with high kinetic energy at the trailing edge places the rotor blades 22 in rotation and, at the same time, acts as extension of the blade profile (see FIG. 2), as a result of which its lift is again increased.

Only the rotor blades 22 and the connecting ring (FIG. 4) participate in the rotation of the rotor 14 which has been described, while the rotor head 20 itself is stationary. Only the impeller 26 turns within it.

The attachment of the rotor blades 22 to the connection 38 of the connecting ring 36 is effected via flapping hinges and/or drag hinges (not shown) so that the rotor blades 22 can tilt in known manner around a horizontal axis while the flapping hinges permit periodic displacement of the rotor blades 22 for change in the angle of attack, for instance via cams or a swashplate.

For the rotary drive of the impeller 26 an internal combustion engine 50 (FIG. 5) is provided, developed as a radial engine in the embodiment shown. It is arranged in the annular space 30 of the rotor 14 in fixed position below the guide vanes 28. Its vertical drive shaft (not shown) is connected to the impeller 26.

The arrangement of the engine 50 in the annular space 30 has the twofold advantage that the passing air drawn in by the impeller 26 both cools the engine 50 and sees to the charging thereof, so that the engine requires neither expensive cooling nor a compressor. The exhaust gases of the engine 50, moreover flow into the hollow rotor blades 22 where they produce additional pressure and at the same time prevent icing of the rotor blades 22.

Figure 6:
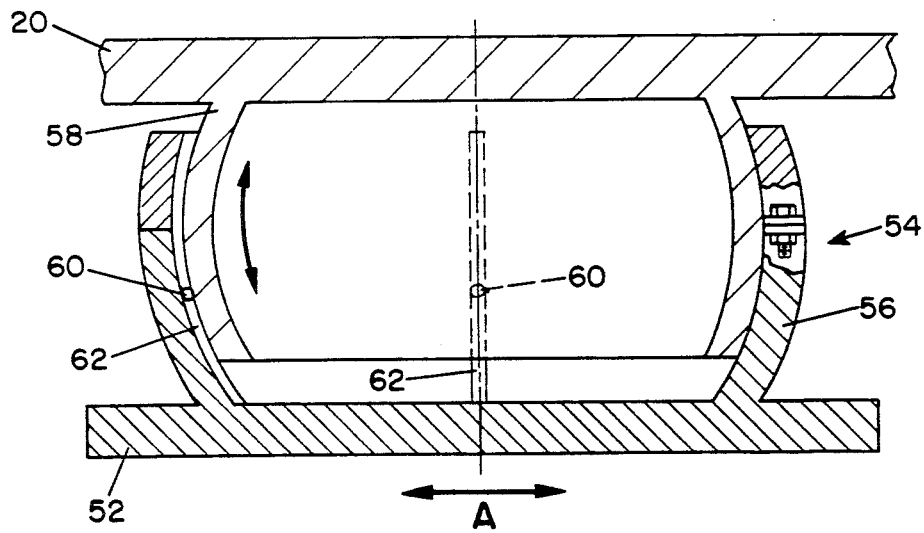
FIG. 6 is an enlarged showing of the mounting of the rotor.

FIGS. 5 and 6 indicate that the entire rotor head 20 borne by a mounting plate 52 can be displaced in the direction of the longitudinal axis of the fuselage 12 (double arrow A). In this way, the pilot can adapt the position of the rotor 14 to the center of gravity of the helicopter 10.

In FIG. 6, which shows a more detailed view as compared with FIG. 5, it can furthermore be noted that the rotor 14 is not rigidly connected to the mounting plate 52 mounted on the fuselage 12, but is swingable around two horizontal axes which extend at a right angle to each other. For this purpose, a pivot bearing 54 is provided, the outer shell 56 of which is fastened on the mounting plate 52 and the inner shell 58 on the bottom of the rotor head 20. Two pins 60 protrude from the inner shell 58, said pins lying in two vertical planes forming a right angle with each other and each engaging in a corresponding groove 62 which is provided in the inner side of the outer shell 56 and lies in a corresponding vertical plane. With this development, the rotor head 20 can be swung within the two vertical planes without turning around its yaw axis.

By means of the pivot bearing 54, the pilot can swing the rotor 14 and thus the plane of the rotor blades in, for instance, a forward direction so that the lift is given a horizontal component which causes the advance of the helicopter. In this solution, periodic displacements of the rotor blades 22 around their drag joints is not necessary. As shown in FIG. 1, the rudder 18 of the rotary wing aircraft 10 is pivoted via an oblique pivot shaft 64 to the tail 16. FIG. 1 shows that the rudder 18 can furthermore be pivoted in combined fashion, for which it has an additional vertical axis of swing 66.

When the rudder 18, which has been swung around its oblique pivot axis 64, is blown against in a downward direction, the fuselage 12 effects in a hovering state a rotation around the yaw axis.

Figure 7:
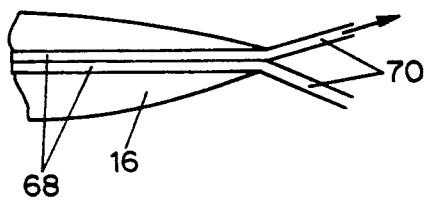
FIG. 7 is a diagram of a tail variant.

FIG. 7 shows diagrammatically a variant with which the same effect can be obtained. In this case, two connecting conduits 68 to the tail 16 extend within the fuselage 12 from the annular space 30 of the rotor head 20, each of said conduits debouching into a corresponding obliquely outwardly-directed control nozzle 70. By the action of pressure on the corresponding control nozzle 70, rotation of the fuselage 12 around the yaw axis can be introduced.

Figure 8:
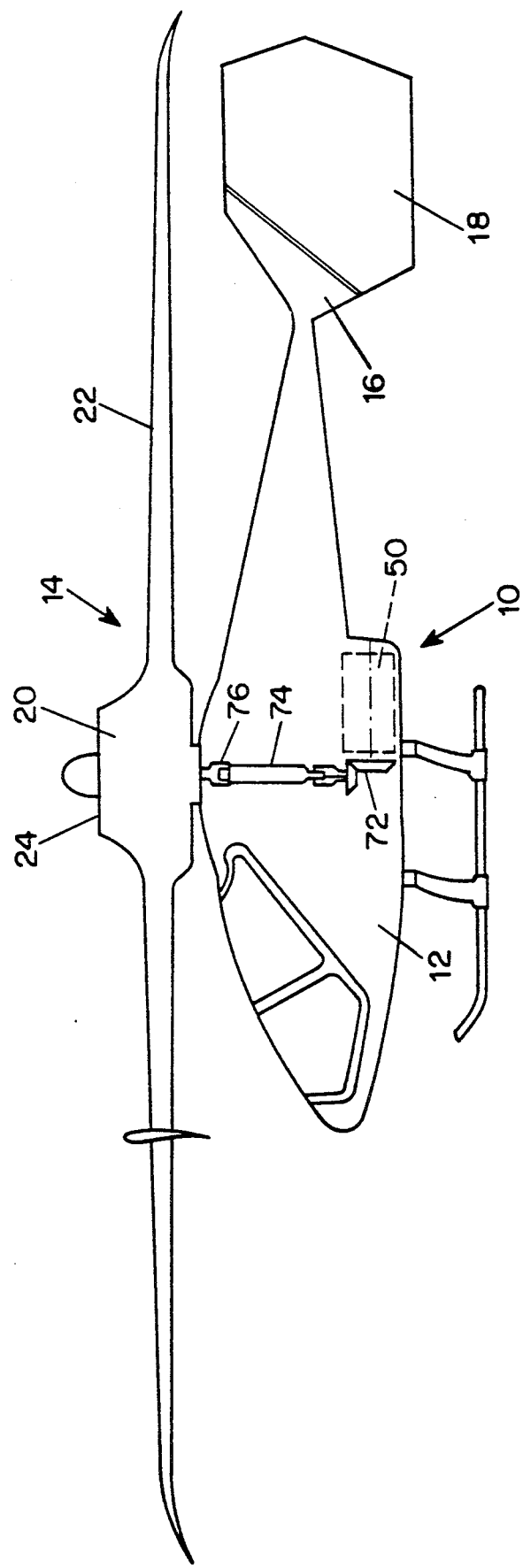
FIG. 8 is a variant of the rotary wing aircraft.
Figure 9:
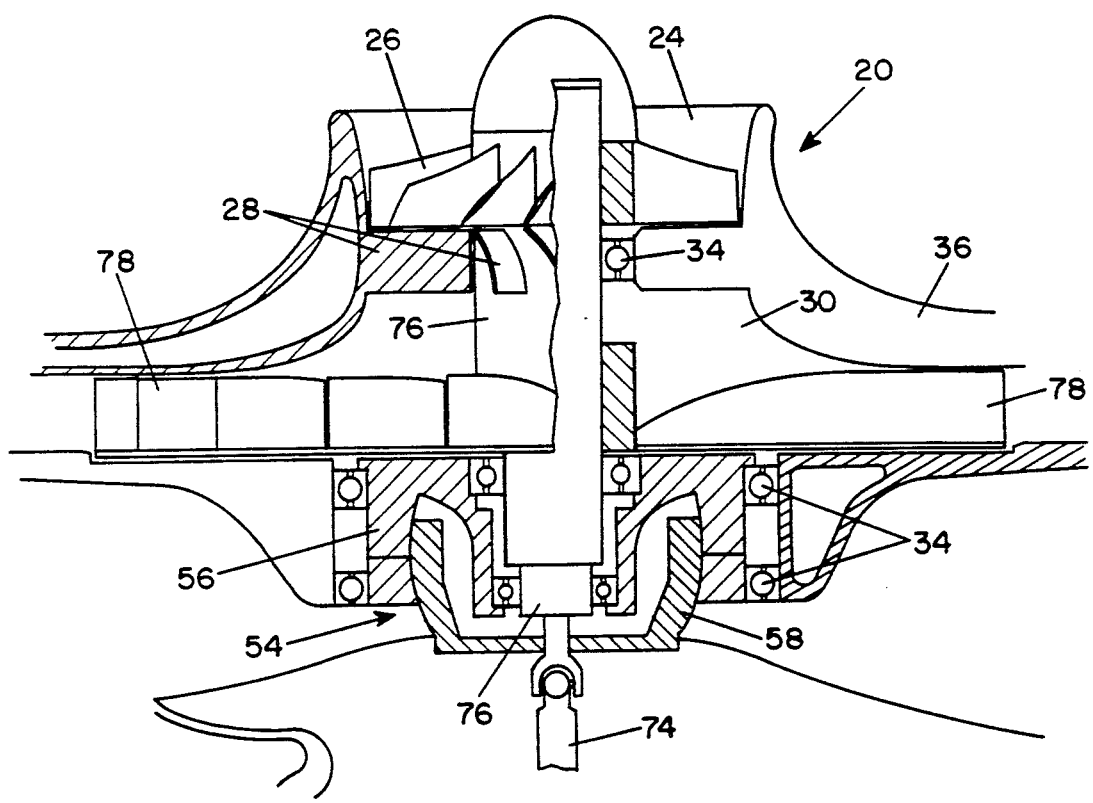
FIG. 9 shows a rotor head, partially in section, of the variant in accordance with FIG. 8.

In the embodiment of FIGS. 8 and 9, the engine 50, for instance a diesel engine or gas turbine, is arranged in the fuselage 12 of the rotary wing aircraft 10 and connected via bevel gear 72 and a universal shaft 74 to the drive shaft 76 of the axially traversed impeller 26. Behind the stationary guide vanes 28 as seen in the direction flow, (FIG. 9) a radially traversed compressor wheel 78 is fastened on the drive shaft 76, its pressure side debouching into the annular space 30 which extends into the connecting ring 36 bearing the hollow rotor blades 22. The connecting ring 36 is supported by the anti-friction bearings 34 in the upper part of the rotor head 20 on the drive shaft 76 and in the lower part on the outer shell 56 of the pivot bearing 54. Since the engine 50 is not arranged in the rotor head 20 in this embodiment, the anti-friction bearings 34 can have a substantially smaller diameter than in the example of FIG. 5. The connecting ring 36 of the rotor head 20 turns, in this connection, together with the rotor blades 22 with a speed that is substantially less than that of the drive shaft 76.

The invention provides a rotary wing aircraft having a very favorable ratio of dead weight to take-off mass; this ratio is about 40%. The machine can be flown in a simple manner and can be manufactured at a favorable price. It has very large drive power. Due to its few moving parts, maintenance is simple and inexpensive. Because of its simple construction, it is of low net weight. Thus, a relatively large blade weight can be realized, as a result of which, on one hand, the dynamic stability is favorable and, on the other hand, the instability of hovering flight is greatly reduced as a result of good damping. Furthermore, due to the storing of a large amount of rotational energy, there is the advantage that, in the event of failure of the engine, effective pullout maneuvers can be carried out by increasing the blade angle of attack. The blade angle of attack can be maintained at about 4°, thus obtaining the structural advantage that a shift to autogyro operation can be dispensed with.

The non-rotating development of the rotor head 20 provides the possibility of arranging on its top a platform which provides protection in the case of military use and can serve as support for a weapon. It should be understood that the preferred embodiments and examples described are for illustrative purposes only and are not to be construed as limiting the scope of the present invention which is properly delineated only in the appended claims.

I claim:

1. A rotary wing aircraft having a drive apparatus, said drive apparatus comprising:

a rotor head having an air suction region;

a rotor blade rotatably mounted on said rotor head having a trailing edge and a hollow interior and provided on said trailing edge at least one outlet for compressed air; and a suction device mounted in said air suction region, said suction device having a pressure side connected to said hollow interior of said rotor blade, an impeller rotatably driven around a vertical axis of said rotor head and a plurality of stationary guide vanes mounted downstream of said impeller.

2. A rotary wing aircraft according to claim 1, wherein a radially trasversed compressor wheel is arranged downstream of the stationary guide vanes.

3. A rotary wing aircraft according to claim 1, wherein the rotor head, on the pressure side of the suction device, comprises an annular space having a plurality of outwardly extending radial openings that are defined by generally cylindrical walls, and wherein, mounted on said walls is an inwardly open connecting ring that is rotatable around a vertical axis of the rotor head.

4. A rotary wing aircraft according to claim 3, wherein the rotor blades are mounted on the connecting ring via one or more of flapping hinges and drag hinges.

5. A rotary wing aircraft according to claim 1, wherein a tail of the rotary wing aircraft has a respective control nozzle on each of its sides, said nozzles being in flow communication to a pressure side of the suction device.

6. A rotary wing aircraft according to claim 1, wherein the suction device is rotated by an engine.

7. A rotary wing aircraft according to claim 6, wherein the rotor head is non-rotatable and the engine is mounted therein.

8. A rotary wing aircraft according to claim 7, wherein the engine is an internal combustion engine.

9. A rotary wing aircraft according to claim 8, wherein the engine is positioned in the communication path between a pressure side of the suction device and the hollow interiors of the rotor blades.

10. A rotary wing aircraft according to claim 1, wherein the rotor head is displaceably fastened on the rotory wing aircraft via a pivot bearing.

11. A rotary wing aircraft according to claim 1, wherein the rotor head is fastened on a fuselage of the rotary wing aircraft in such a manner as to be adjustable in its longitudinal direction with respect to the fuselage.

12. A rotary wing aircraft according to claim 1, wherein deflection ribs leading to said at least one outlet opening are provided in each rotor blade.

13. A rotary wing aircraft according to claim 12, wherein the length of the deflector ribs increases towards the tip of the rotor blade.

14. A rotary wing aircraft according to claim 1, comprising an obliquely pivoted rudder on a tail of the rotary wing aircraft.

15. A rotary wing aircraft according to claim 14, wherein the rudder is pivoted in combination about a first substantially vertical axis and about a second oblique axis so as to provide an additional yaw axis of swing.

* * * * *